(12) United States Patent
Marvel et al.

(10) Patent No.: US 11,525,520 B2
(45) Date of Patent: Dec. 13, 2022

(54) HIGHLY RELIABLE SERVICE PORT

(71) Applicant: GE Oil & Gas ESP, Inc., Oklahoma City, OK (US)

(72) Inventors: Robert Lee Marvel, Norman, OK (US); Joseph Ashurst, Guthrie, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 0 days.

(21) Appl. No.: 15/105,820

(22) PCT Filed: Dec. 18, 2013

(86) PCT No.: PCT/US2013/076271
§ 371 (c)(1),
(2) Date: Jun. 17, 2016

(87) PCT Pub. No.: WO2015/094250
PCT Pub. Date: Jun. 25, 2015

(65) Prior Publication Data
US 2017/0002944 A1    Jan. 5, 2017

(51) Int. Cl.
*F16K 15/00* (2006.01)
*E21B 34/00* (2006.01)
*F16K 15/02* (2006.01)
*E21B 43/12* (2006.01)
*E21B 34/06* (2006.01)

(52) U.S. Cl.
CPC ............ *F16K 15/026* (2013.01); *E21B 34/06* (2013.01); *E21B 43/128* (2013.01)

(58) Field of Classification Search
CPC ........ F04D 13/10; E21B 34/06; E21B 43/128; F16K 17/168; F16K 15/00; F16K 15/026; F16K 15/044; F16K 17/0406; F16K 15/205; Y10T 137/7854; Y10T 137/7855; Y10T 137/7856
USPC .................... 137/515, 515.3, 515.5; 251/321
See application file for complete search history.

(56) References Cited

U.S. PATENT DOCUMENTS

| | | | | | |
|---|---|---|---|---|---|
| 2,973,779 | A | * | 3/1961 | Kennedy | F16K 17/168 417/311 |
| 3,029,835 | A | * | 4/1962 | Biello | F16K 15/063 251/86 |
| 3,099,997 | A | * | 8/1963 | Kroffke | F16K 15/044 137/493.8 |
| 3,104,676 | A | * | 9/1963 | Steer | F16K 15/00 251/339 |
| 4,173,986 | A | * | 11/1979 | Martin | F16K 17/168 128/205.24 |

(Continued)

OTHER PUBLICATIONS

Office Action issued in connection with corresponding CA Application No. 2934480 dated Apr. 23, 2018.

(Continued)

*Primary Examiner* — Kelsey E Cary
(74) *Attorney, Agent, or Firm* — Crowe & Dunlevy, P.C.

(57) ABSTRACT

A port for use in introducing a fluid into an internal fluid chamber includes a plug bore, a valve disposed in the plug bore and a plug. The plug includes one or more seal grooves and a ring seal in each of the one or more seal grooves. The ring seal creates a seal between the plug and the plug bore. The port further includes a positive stop barrier that prevents the plug from being removed from the plug bore.

4 Claims, 2 Drawing Sheets

(56) References Cited

U.S. PATENT DOCUMENTS

| | | | |
|---|---|---|---|
| 4,436,488 A | | 3/1984 | Witten |
| 4,883,148 A | | 11/1989 | Welch |
| 5,873,414 A | * | 2/1999 | von Gynz-Rekowski ................... E21B 21/103 166/319 |
| 5,901,743 A | * | 5/1999 | Schulz ...................... F16K 1/12 137/540 |
| 6,966,874 B2 | * | 11/2005 | Cornay ................ A61K 31/662 494/33 |
| 2007/0224057 A1 | | 9/2007 | Swatek et al. |
| 2007/0277969 A1 | | 12/2007 | Hall et al. |
| 2009/0000675 A1 | * | 1/2009 | Baros ...................... F16K 15/04 137/538 |
| 2009/0010773 A1 | | 1/2009 | Parmeter et al. |
| 2010/0047383 A1 | * | 2/2010 | Tabassi ............... B29C 45/2806 425/564 |
| 2010/0230628 A1 | | 9/2010 | Stefina |
| 2013/0034159 A1 | * | 2/2013 | Siekmann ............... H04N 19/61 375/240.12 |
| 2013/0276919 A1 | * | 10/2013 | Petroci .................... F16K 1/307 137/535 |
| 2013/0284453 A1 | | 10/2013 | Vick, Jr. et al. |
| 2014/0131606 A1 | * | 5/2014 | Smith, III ........... E21B 33/0355 251/282 |

OTHER PUBLICATIONS

PCT Search Report issued in connection with corresponding Application No. PCT/US2013/076271 dated Sep. 23, 2014.
Office Action issued in connection with corresponding CA Application No. 2934480 dated Dec. 19, 2018.

* cited by examiner

HIGHLY RELIABLE SERVICE PORT

FIELD OF THE INVENTION

This invention relates generally to the field of pumping systems and more particularly to mechanisms for servicing components within pumping systems.

BACKGROUND

Submersible pumping systems are often deployed into wells to recover petroleum fluids from subterranean reservoirs. Typically, a submersible pumping system includes a number of components, including an electric motor coupled to one or more high performance pump assemblies. Seal sections are often used to isolate the electric motor from the fluids and thrust produced by the pump assemblies. The electric motor, seal sections and other components are often filled with lubricating fluid. The lubricating fluid is used to reduce friction and oppose external pressures applied to the pumping system. Lubricating fluids are often introduced during manufacture and exchanged at regular service intervals.

The lubricating fluid is typically placed into the pump system component through a fill port. Prior art fill ports often include a threaded bolt that provides access to a one-way valve. The one-way valve prohibits fluid from escaping through the fill port when the threaded bolt is removed. Inelastic "crush" seals or washers are used to seal the bolt in the fill port. Although widely accepted, the use of crush seals and threaded bolts may present problems over time. Initially, it is difficult to ensure that a uniform deformation of the crush seal is achieved as the threaded bolt is placed into the fill port. Subsequently, during operation, it is difficult to determine if the threaded bolt is still in contact with the crush seal. There is, therefore, a continued need for an improved mechanism for introducing lubricating fluids into pump system component. It is to these and other deficiencies in the prior art that the preferred embodiments are directed.

SUMMARY OF THE INVENTION

In a preferred embodiment, the present invention includes a fill port for use in introducing a fluid into an internal fluid chamber. The port includes a plug bore, a valve disposed in the plug bore and a plug. The plug includes one or more seal grooves and a ring seal in each of the one or more seal grooves. The ring seal creates a seal between the plug and the plug bore. The port further includes a positive stop barrier that prevents the plug from being removed from the plug bore.

In another aspect, the preferred embodiments include an electric submersible pumping system that includes a pump assembly, a seal section connected to the pump assembly and an electric motor connected to the seal section. The electric motor includes a housing, an internal fluid chamber and a port extending through the housing to the internal fluid chamber. The port includes a plug bore, a valve disposed in the plug bore and a plug. The plug includes one or more seal grooves and a ring seal in each of the one or more seal grooves. The ring seal creates a seal between the plug and the plug bore. The port further includes a positive stop barrier that prevents the plug from being removed from the plug bore.

In another aspect, the preferred embodiments include a method for introducing a fluid into an internal fluid chamber of a pumping system component. The method includes the steps of accessing the port and removing a positive stop barrier. The method continues by removing a plug and injecting fluid into the internal fluid chamber through the port. Next, the plug is replaced in the port and the positive stop barrier is returned to a stop groove in the port. The positive stop barrier prevents the plug from being removed from the plug bore.

DETAILED DESCRIPTION OF THE PREFERRED EMBODIMENTS

Figure 1:
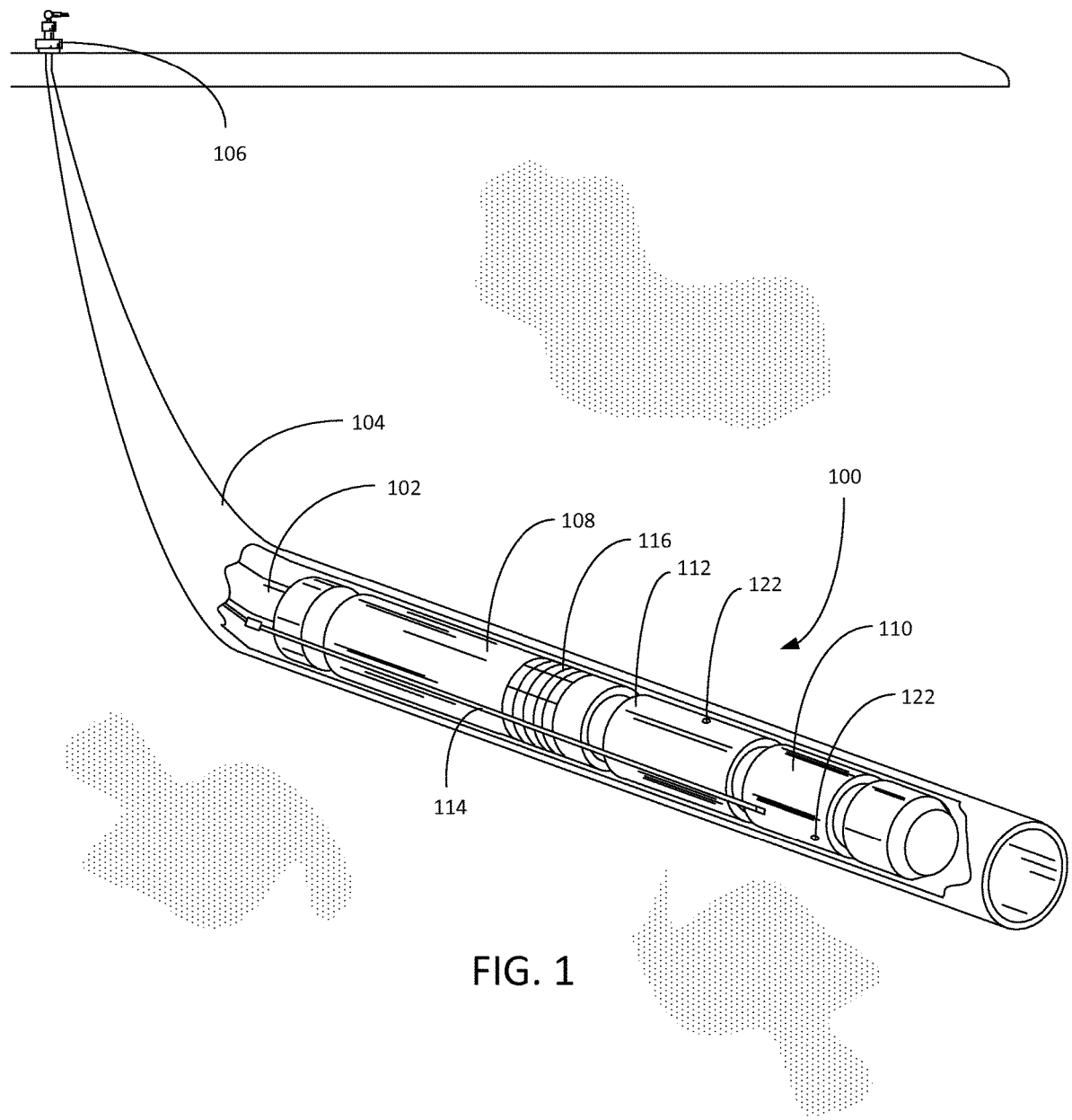
FIG. 1 is an elevational depiction of a submersible pumping system constructed in accordance with a preferred embodiment.

In accordance with preferred embodiments of the present invention, FIG. 1 shows an elevational view of a pumping system 100 attached to production tubing 102. The pumping system 100 and production tubing are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids.

The pumping system 100 preferably includes some combination of a pump 108, a motor 110 and a seal section 112. The seal section 112 shields the motor 110 from wellbore fluids and accommodates the thermal expansion of lubricants within the motor 110. The motor 110 is provided with power from the surface by a power cable 114. Although only one pump 108 and one motor 110 are shown, it will be understood that more can be connected when appropriate. The pump 108 is preferably fitted with an intake section 116 to allow well fluids from the wellbore 104 to enter the pump 108, where the well fluid is forced to the surface through the production tubing 102. It will also be appreciated that the pumping system 100 may be deployed in surface-mounted applications, which may include, for example, the transfer of fluids between storage facilities, the removal of liquid on surface drainage jobs, the withdrawal of liquids from subterranean formations and the injection of fluids into subterranean wells.

Figure 2:
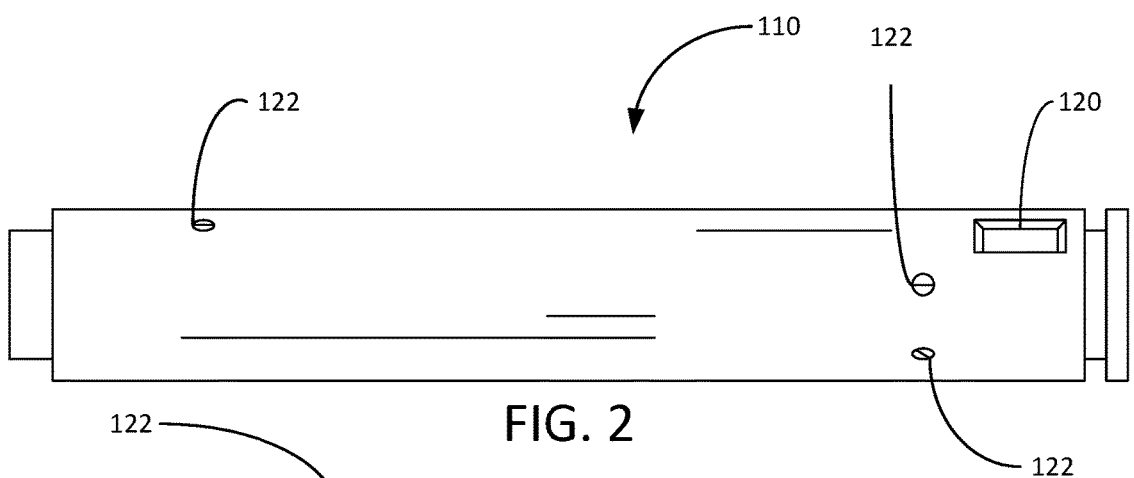
FIG. 2 is a side view of the motor from the pumping system of FIG. 1.

Turning to FIG. 2, shown therein is a side view of the motor 110. The motor 110 is preferably a fluid-filled electric motor that includes a housing 118, a pothead connector receptacle 120 and one or more ports 122. It will be appreciated that the ports 122 may be incorporated into other components within the pumping system 100. For example, as noted in FIG. 1, the seal section 112 is also provided with a port 122.

Figure 3:
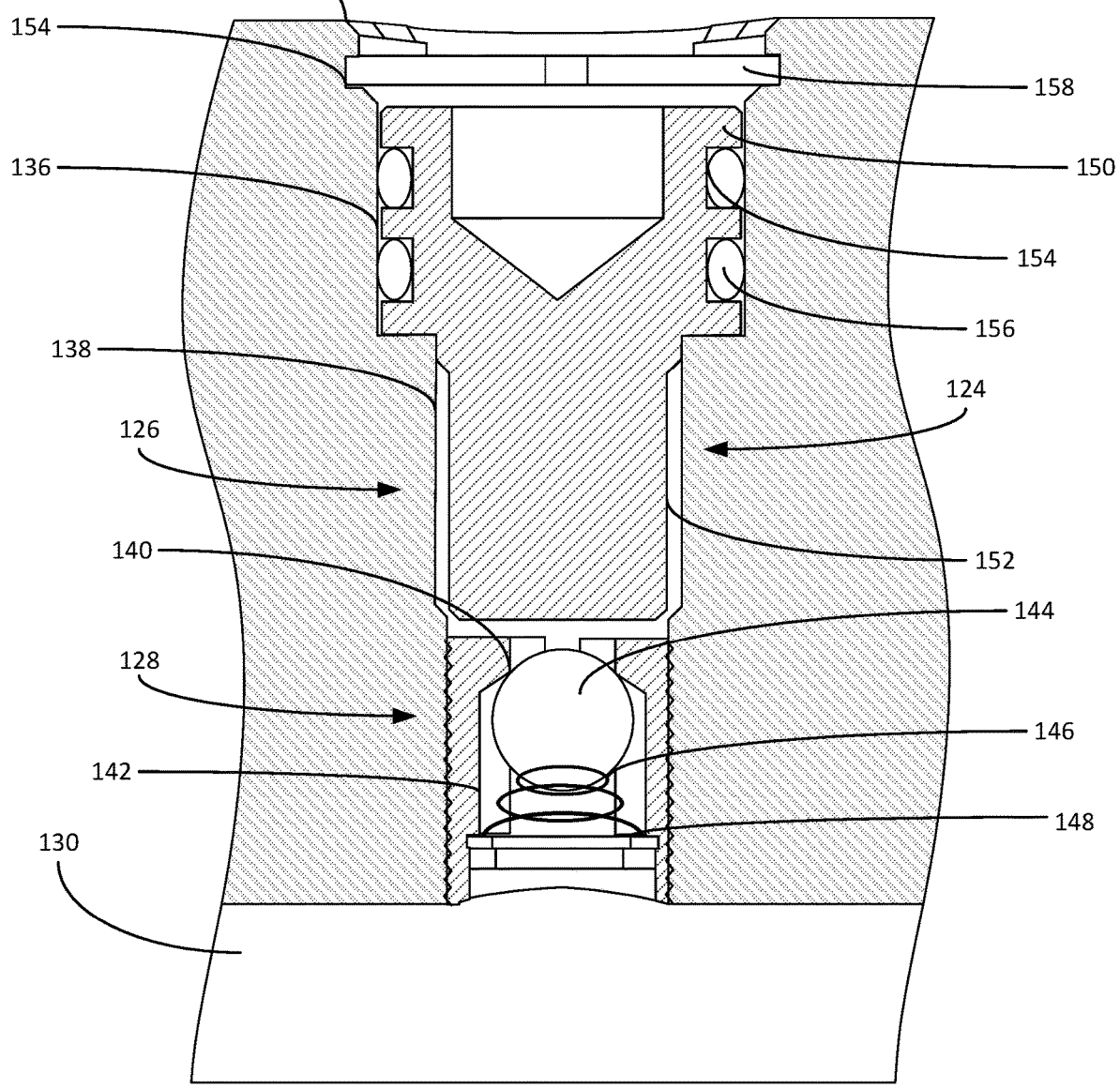
FIG. 3 is a cross-sectional view of a port constructed in accordance with a preferred embodiment.

Turning to FIG. 3, shown therein is a cross-sectional view of a preferred embodiment of the port 122. The port 122 preferably includes a plug 124, a plug bore 126 and valve assembly 128. The plug bore 126 extends through the motor housing 118 and is in fluid communication with an internal fluid chamber 130 within the motor 110. The plug bore 126 preferably includes a service opening 132, a stop groove 134, an upper bore 136 and a lower bore 138. Each of these features of the plug bore 126 are preferably milled or otherwise produced into the housing 118 of the motor 110. In a particularly preferred embodiment, the stop groove 134 has a diameter that is slightly larger than the service opening 132 and the upper bore 136. The upper bore 136 is preferably slightly larger than the lower bore 138.

The valve assembly 128 is disposed in the lower bore 136. In particularly preferred embodiments, the valve assembly 128 is configured for a threaded engagement with the lower bore 136. The valve assembly 128 is preferably configured as a ball-valve that includes a valve seat 140, a valve cage 142, a ball 144, a valve spring 146 and a valve base 148. Under normal conditions, the valve spring 146 presses the ball 144 against the valve seat 140 to prevent fluid from leaving the fluid chamber 130 through the plug bore 126. During a service operation, pressure applied to the top of the ball 144 forces the ball 144 and valve spring 146 downward to unseat the ball 144. This permits the introduction of fluid into the fluid chamber 130 through the plug bore 126.

The plug 124 includes a head 150 and a stem 152. The stem 152 is sized and configured to be accepted within the lower bore 138 of the plug bore 126. The head 150 is sized and configured to be accepted within the upper bore 136 of the plug bore 126. The plug 124 further includes one or more seal grooves 154 and one or more ring seals 156. In a particularly preferred embodiment, the plug 124 includes two seal grooves 154 and two ring seals 156. In particularly preferred embodiments, the ring seals 156 are O-ring seals constructed from a durable, chemical-resistant fluoropolymer elastomer. Suitable polymers include those offered by DuPont Performance Elastomers, L.L.C. under the Viton® brand. The rings seals 156 are retained inside the seal grooves 154 and press against the upper bore 136. The ring seals 156 provide a durable seal that represents a significant advancement over the inelastic "crush" seals used in the prior art.

The port 122 further includes a positive stop barrier 158. The positive stop barrier 158 is configured to be removed from, and inserted into, the stop groove 134 with the aid of a tool. In a particularly preferred embodiment, the positive stop barrier 158 is a lock ring or "snap ring" that can be inserted through the service opening 132 into the stop groove 134 with the aid of snap-ring pliers. Releasing the positive stop barrier 158 in the stop groove 134 prevents the plug 124 from moving in an axial direction within the plug bore 126.

Thus, the preferred embodiments include an improved service port that incorporates a non-threaded engagement between the plug 124 and the plug bore 126. The use of the positive stop barrier 158 and ring seals 156 provides a reliable mechanism for creating a selectively closed and sealed service port. Although the port 122 has been disclosed in the context of the motor 110 and seal section 112, it will be appreciated that the port 122 will find utility in a number of additional applications. The port 122 will find particular utility in those applications that demand a robust seal between the internal fluid chamber 130 and the external environment and where it is difficult to monitor the performance of the port 122.

In another aspect, the preferred embodiments include a method for introducing a fluid into the internal fluid chamber 130. The method includes the steps of accessing the port 122 and removing the positive stop barrier 158. The method continues by removing the plug 124 and injecting the fluid into the internal fluid chamber 130 through the port 122. Next, the plug 124 is replaced in the port and the positive stop barrier 158 is returned to the stop groove 134. The positive stop barrier 158 prevents the plug 124 from being removed from the plug bore 126.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A port for use in transferring a fluid to and from an internal fluid chamber, the port comprising:
    a plug bore, wherein the plug bore comprises:
        a non-threaded upper bore; and
        a lower bore with a threaded portion;
    a plug configured for a non-threaded engagement with the plug bore to selectively close and seal the plug bore, wherein the plug comprises:
        a head configured to be accepted within the non-threaded upper bore, wherein the head includes one or more seal grooves;
        a stem extending into the lower bore above the threaded portion, wherein the stem does not include a passage that permits the fluid to pass through the stem; and
        one or more ring seals, wherein each of the one or more ring seals is captured in a corresponding one of the one or more seal grooves; and
    a valve assembly captured by a threaded engagement within the threaded portion of the lower bore.

2. The port of claim 1, wherein the plug bore comprises:
    a service opening; and
    a stop groove adjacent the service opening.

3. The port of claim 2 further comprising a positive stop barrier retained within the stop groove.

4. The port of claim 3, wherein the positive stop barrier is a snap ring.

* * * * *